(12) United States Patent
Taoka et al.

(10) Patent No.: US 8,964,870 B2
(45) Date of Patent: Feb. 24, 2015

(54) MOBILE STATION APPARATUS AND CHANNEL INFORMATION FEEDBACK METHOD

(75) Inventors: Hidekazu Taoka, Tokyo (JP); Katsutoshi Kusume, Tokyo (JP); Karim Ibrahim Khashaba, Tokyo (JP)

(73) Assignee: NTT DOCOMO, Inc., Tokyo (JP)

( * ) Notice: Subject to any disclaimer, the term of this patent is extended or adjusted under 35 U.S.C. 154(b) by 67 days.

(21) Appl. No.: 13/522,427

(22) PCT Filed: Jan. 20, 2011
(Under 37 CFR 1.47)

(86) PCT No.: PCT/JP2011/050946
§ 371 (c)(1),
(2), (4) Date: Nov. 28, 2012

(87) PCT Pub. No.: WO2011/090105
PCT Pub. Date: Jul. 28, 2011

(65) Prior Publication Data
US 2013/0294535 A1 Nov. 7, 2013

(30) Foreign Application Priority Data
Jan. 20, 2010 (JP) ................................. 2010-010058

(51) Int. Cl.
*H04B 7/02* (2006.01)
*H04B 7/04* (2006.01)
(Continued)

(52) U.S. Cl.
CPC ............ *H04B 7/0417* (2013.01); *H04B 7/0452* (2013.01); *H04L 25/0391* (2013.01);
(Continued)

(58) Field of Classification Search
CPC .. H04B 7/0639; H04B 7/0417; H04B 7/0452; H04B 7/0456; H04W 28/18; H04L 1/0026; H04L 25/0204; H04L 25/0224; H04L 25/0391; H04L 5/0007
USPC .................................. 375/267, 260, 259, 295
See application file for complete search history.

(56) References Cited

U.S. PATENT DOCUMENTS

2007/0280386 A1* 12/2007 Waes et al. .................... 375/347
2007/0297529 A1* 12/2007 Zhou et al. .................... 375/267
(Continued)

FOREIGN PATENT DOCUMENTS

EP       2 073 471 A1    6/2009
JP      2009-153140 A    7/2009
(Continued)

OTHER PUBLICATIONS

International Search Report w/translation from PCT/JP2011/050946 dated Feb. 22, 2011 (4 pages).
(Continued)

*Primary Examiner* — Kenneth Lam
(74) *Attorney, Agent, or Firm* — Osha Liang LLP

(57) ABSTRACT

To perform feedback of channel information suitable for MU-MIMO transmission while exploiting a codebook that defines precoding matrixes and PMIs suitable for SU-MIMO transmission, it is a feature that a channel matrix corresponding to a channel transmission path is defined using a plurality of precoding matrixes defined in a codebook suitable for SU-MIMO transmission and a plurality of adjustment coefficients to respectively adjust the plurality of precoding matrixes, a channel information selecting section (111) selects a plurality of precoding matrixes and/or a plurality of adjustment coefficients, and that the selected plurality of precoding matrixes and/or the plurality of adjustment coefficients are transmitted to a base station apparatus as channel information in uplink.

11 Claims, 6 Drawing Sheets

(51) Int. Cl.
  *H04L 25/03* (2006.01)
  *H04B 7/06* (2006.01)
  *H04L 1/00* (2006.01)
  *H04L 5/00* (2006.01)
  *H04L 25/02* (2006.01)
  *H04W 28/18* (2009.01)

(52) U.S. Cl.
  CPC ............ *H04B 7/0456* (2013.01); *H04B 7/0639* (2013.01); *H04L 1/0026* (2013.01); *H04L 5/0007* (2013.01); *H04L 25/0204* (2013.01); *H04L 25/0224* (2013.01); *H04W 28/18* (2013.01)
  USPC ............ 375/267; 375/260; 375/259; 375/295

(56) References Cited

U.S. PATENT DOCUMENTS

| | | | | |
|---|---|---|---|---|
| 2008/0304463 A1* | 12/2008 | Borkar et al. | ................ | 370/342 |
| 2008/0304464 A1* | 12/2008 | Borkar et al. | ................ | 370/342 |
| 2009/0190685 A1* | 7/2009 | Kimura | ................ | 375/267 |
| 2009/0274230 A1* | 11/2009 | Heath et al. | ................ | 375/260 |
| 2009/0322613 A1* | 12/2009 | Bala et al. | ................ | 342/373 |
| 2010/0054212 A1* | 3/2010 | Tang | ................ | 370/335 |
| 2010/0074353 A1* | 3/2010 | Zhou et al. | ................ | 375/260 |
| 2010/0103832 A1* | 4/2010 | Zhou et al. | ................ | 370/252 |
| 2010/0303170 A1* | 12/2010 | Zhu et al. | ................ | 375/297 |
| 2011/0080965 A1* | 4/2011 | Liu et al. | ................ | 375/260 |
| 2011/0200131 A1* | 8/2011 | Gao et al. | ................ | 375/267 |
| 2012/0015680 A1* | 1/2012 | Yang et al. | ................ | 455/517 |
| 2012/0044894 A1* | 2/2012 | Ko et al. | ................ | 370/329 |
| 2012/0082149 A1* | 4/2012 | Kim et al. | ................ | 370/338 |
| 2012/0113851 A1* | 5/2012 | Schober et al. | ................ | 370/252 |
| 2012/0314808 A1* | 12/2012 | Taoka et al. | ................ | 375/299 |

FOREIGN PATENT DOCUMENTS

| | | |
|---|---|---|
| JP | 2009-182649 A | 8/2009 |
| JP | 2009-268106 A | 11/2009 |
| WO | 2008/138165 A1 | 11/2008 |

OTHER PUBLICATIONS

3GPP TR 25.913 V8.0.0; "3rd Generation Partnership Project; Technical Specification Group Radio Access Network; Requirements for Evolved UTRA (E-UTRA) and Evolved UTRAN (E-UTRAN) (Release 8)"; Dec. 2008 (18 pages).

Espacenet Abstract Publication No. J2009268106A dated Nov. 12, 2009 (1 page).

Office Action for Japanese Application No. 2010-010058 mailed Feb. 19, 2013, with English translation thereof (5 pages).

* cited by examiner

MOBILE STATION APPARATUS AND CHANNEL INFORMATION FEEDBACK METHOD

TECHNICAL FIELD

The present invention relates to a mobile station apparatus and channel information feedback method, and more particularly, to a mobile station apparatus and channel information feedback method that support multi-antenna transmission.

BACKGROUND ART

In UMTS (Universal Mobile Telecommunications System) networks, for the purpose of improving spectral efficiency and further improving data rates, by adopting HSDPA (High Speed Downlink Packet Access) and HSUPA (High Speed Uplink Packet Access), it is performed exploiting maximum features of the system based on W-CDMA (Wideband Code Division Multiple Access). For the UMTS network, for the purpose of further increasing high-speed data rates, providing low delay and the like, Long Term Evolution (LTE) has been studied.

In the 3G system, a fixed band of 5 MHz is substantially used, and it is possible to achieve transmission rates of approximately maximum 2 Mbps in downlink. Meanwhile, in the LTE-scheme system, using variable bands ranging from 1.4 MHz to 20 MHz, it is possible to achieve transmission rates of maximum 300 Mbps in downlink and about 75 Mbps in uplink. Further, in the UMTS network, for the purpose of further increasing the wide-band and high speed, successor systems to LTE have been studied (for example, LTE Advanced (LTE-A)). For example, in LTE-A, it is scheduled to increase 20 MHz that is the maximum system band in LTE specifications to about 100 MHz.

Meanwhile, in the LTE-scheme system, MIMO (Multi Input Multi Output) systems are proposed as radio communication techniques for transmitting and receiving data using a plurality of antennas and improving a data rate (spectral efficiency) (for example, see Non-patent Document 1). In the MIMO systems, the transmitter/receiver is provided with a plurality of transmission/reception antennas, and simultaneously transmits different transmission information sequences from different transmission antennas. Meanwhile, the receiver side exploits the fact that different fading variations occur in between transmission and reception antennas, and divides the simultaneously-transmitted information sequences to detect, and it is thereby possible to increase the data rate (spectral efficiency).

In the LTE-scheme system, specified are Single User MIMO (SU-MIMO) transmission in which transmission information sequences simultaneously transmitted from different transmission antennas are all for the same user and Multiple User MIMO (MU-MIMO) transmission in which the transmission information sequences are for different users. In the SU-MIMO transmission and MU-MIMO transmission, the receiver side selects an optimal PMI (Precoding Matrix Indicator) from a codebook that defines a plurality of phase/amplitude control amounts (precoding matrixes (precoding weights)) to set on antennas of the transmitter and PMIs associated with the precoding matrixes, and transmits the PMI as channel information (CSI: Channel State Information) to the transmitter as feedback. The transmitter side performs precoding on each transmission antenna based on the PMI that is transmitted from the receiver as feedback, and transmits transmission information sequences.

CITATION LIST

Non-Patent Literature

[Non-patent Literature 1] 3GPP TR 25.913 "Requirements for Evolved UTRA and Evolved UTRAN"

SUMMARY OF INVENTION

Technical Problem

In the LTE-scheme system, the codebook specified for feedback of the channel information defines precoding matrixes and PMIs suitable for SU-MIMO transmission. In MU-MIMO transmission, feedback of the channel information is thus performed using precoding matrixes and PMIs suitable for SU-MIMO transmission. Therefore, there is the problem that the receiver side is notable to transmit channel information in response to the actual channel state to the transmitter as feedback.

Meanwhile, as described above, in the LTE-A-scheme system, it is scheduled that the maximum system bandwidth is increased to about 100 MHz and that the maximum number of transmission antennas is increased to "8". In an environment in which the system bandwidth and the number of transmission antennas are thus increased, it is expected to use MU-MIMO transmission to increase the data rate (spectral efficiency) of the entire system. To increase the data rate in MU-MIMO transmission, it is a significantly important issue to improve the channel information transmitted from the receiver side to the transmitter as feedback.

To actualize feedback of the channel information suitable for MU-MIMO transmission, it is conceivable to prepare a codebook (hereinafter, "codebook suitable for MU-MIMO transmission") that defines a set of precoding matrixes and an index (PMI) of each of the precoding matrixes suitable for MU-MIMO transmission separately from a codebook (hereinafter, referred to as a "codebook suitable for SU-MIMO transmission") that defines precoding matrixes and PMIs suitable for SU-MIMO transmission so as to switch the used codebook corresponding to the transmission method of the channel information as feedback. However, in this case, it is necessary to newly specify the codebook suitable for MU-MIMO transmission, processing for switching between the codebooks is required, and thus, there is the problem that loads required for system specification construction are large.

The present invention was made in view of such circumstances, and it is an object of the invention to provide a mobile station apparatus and channel information feedback method for enabling feedback of channel information suitable for MU-MIMO transmission to be performed while exploiting a codebook that defines precoding matrixes and PMIs suitable for SU-MIMO transmission.

Solution to the Problem

A mobile station apparatus of the invention is a mobile station apparatus configured to define a channel matrix corresponding to a channel transmission path using a plurality of precoding matrixes defined in a codebook suitable for SU-MIMO transmission and a plurality of adjustment coefficients to respectively adjust the plurality of precoding matrixes, and is characterized by having selection section configured to select the plurality of precoding matrixes and/or the plurality of adjustment coefficients, and transmission section configured to transmit the plurality of precoding matrixes and/or the plurality of adjustment coefficients selected in the selection section to a base station apparatus as channel information.

According to this configuration, the mobile station apparatus transmits a plurality of precoding matrixes defined in a codebook suitable for SU-MIMO transmission and adjustment coefficients to adjust the plurality of precoding matrixes to the base station apparatus as the channel information, is thereby capable of transmitting the channel information in response to the actual channel state to the base station apparatus as feedback as compared with the case of transmitting one precoding weight defined in the codebook suitable for SU-MIMO transmission, and is thus capable of performing feedback of the channel information suitable for MU-MIMO transmission. Further, since the precoding matrixes defined in the codebook suitable for SU-MIMO transmission are used for feedback of the channel information, it is possible to effectively use the codebook that defines the precoding matrixes suitable for SU-MIMO transmission, and it is thereby possible to improve the data rate in MU-MIMO transmission while maximizing utilization of the configuration of the LTE system.

A channel information feedback method of the invention is a channel information feedback method for defining a channel matrix corresponding to a channel transmission path using a plurality of precoding matrixes defined in a codebook suitable for SU-MIMO transmission and a plurality of adjustment coefficients to respectively adjust the plurality of precoding matrixes, and is characterized by having the steps of selecting the plurality of precoding matrixes and/or the plurality of adjustment coefficients, and transmitting the plurality of precoding matrixes and/or the plurality of adjustment coefficients that are selected to a base station apparatus as channel information as feedback.

According to this method, to the base station apparatus are transmitted a plurality of precoding matrixes defined in a codebook suitable for SU-MIMO transmission and adjustment coefficients to adjust the plurality of precoding matrixes as the channel information, it is thereby possible to transmit the channel information in response to the actual channel state to the base station apparatus as feedback with higher accuracy as compared with the case of transmitting one precoding weight defined in the codebook suitable for SU-MIMO transmission, and it is thus possible to perform feedback of the channel information suitable for MU-MIMO transmission. Further, since the precoding matrixes defined in the codebook suitable for SU-MIMO transmission are used for feedback of the channel information, it is possible to effectively use the codebook that defines the precoding matrixes suitable for SU-MIMO transmission, and it is thereby possible to improve the data rate in MU-MIMO transmission while maximizing utilization of the configuration of the LTE system.

Technical Advantages of the Invention

According to the invention, to the base station apparatus are transmitted a plurality of precoding matrixes defined in a codebook suitable for SU-MIMO transmission and adjustment coefficients to adjust the plurality of precoding matrixes as the channel information, it is thereby possible to transmit the channel information in response to the actual channel state to the base station apparatus as feedback with higher accuracy as compared with the case of transmitting one precoding weight defined in the codebook suitable for SU-MIMO transmission, and it is thus possible to perform feedback of the channel information suitable for MU-MIMO transmission. Further, since the precoding matrixes defined in the codebook suitable for SU-MIMO transmission are used for feedback of the channel information, it is possible to effectively use the codebook that defines the precoding matrixes suitable for SU-MIMO transmission, and it is thereby possible to improve the data rate in MU-MIMO transmission while maximizing utilization of the configuration of the LTE system. As a result, it is possible to perform feedback of the channel information suitable for MU-MIMO transmission while using the codebook that defines precoding matrixes and PMIs suitable for SU-MIMO transmission.

DESCRIPTION OF EMBODIMENTS

Figure 1:
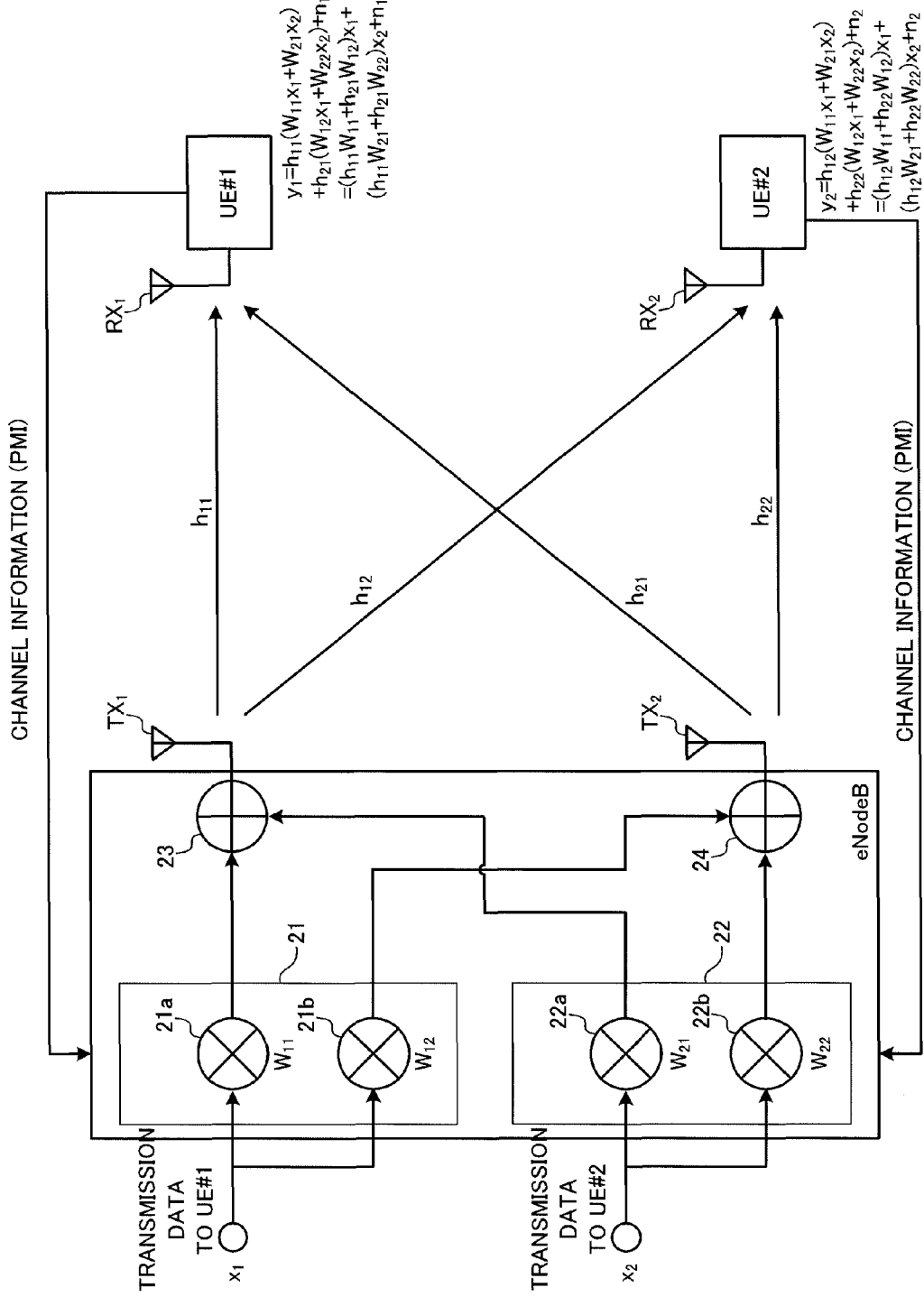
FIG. 1 is a conceptual diagram of a MIMO system in an LTE scheme.

Described first is precoding in downlink MIMO transmission performed in a MIMO system in an LTE scheme, based on a MIMO system as shown in FIG. 1 as the premise. FIG. 1 is a conceptual diagram of the MIMO system in the LTE scheme. In addition, in the MIMO system as shown in FIG. 1, shown is the case where Multiple User MIMO (MU-MIMO) is performed in between a base station apparatus eNode B and two mobile station apparatus UE#1 and UE#2. Further, in the MIMO system as shown in FIG. 1, shown is the case where the base station apparatus eNode B is provided with two transmission antennas, and each of the mobile station apparatuses UE#1 and UE#2 is provided with a single reception antenna.

In precoding in downlink MIMO transmission of the MIMO system as shown in FIG. 1, each of the mobile station apparatuses UE#1 and UE#2 measures a channel variation amount using a reception signal from a reception antenna $RX_1$ or $RX_2$, and based on the measured channel variation amount, selects a PMI corresponding to phase/amplitude control amounts (precoding weights (precoding matrix)) that maximize a reception SINR of transmission data respectively from the transmission antennas $TX_1$ and $TX_2$ of the base station apparatus eNode B. Then, the mobile station apparatus transmits the selected PMI as the channel information to the base station apparatus eNode B as feedback in uplink. The base station apparatus eNode B performs precoding on transmission data $x_1$ to the mobile station apparatus UE#1 and transmission data $x_2$ to the mobile station apparatus UE#2 corresponding to the PMIs transmitted from the user apparatuses UEs as feedback, and then transmits the information from each of the transmission antennas $TX_1$ and $TX_2$.

The base station apparatus eNode B is provided with precoding processing sections 21 and 22 that perform precoding on the transmission data $x_1$ and $x_2$, respectively. The precoding processing section 21 has a weight multiplying section 21a that multiplies a precoding weight $W_{11}$ to transmit the transmission data $x_1$ from the transmission antenna $TX_1$, and a weight multiplying section 21b that multiplies a precoding weight $W_{12}$ to transmit the transmission data $x_1$ from the transmission antenna $TX_2$. Similarly, the precoding processing section 22 has a weight multiplying section 22a that multiplies a precoding weight $W_{21}$ to transmit the transmission data $x_2$ from the transmission antenna $TX_1$, and a weight multiplying section 22b that multiplies a precoding weight $W_{22}$ to transmit the transmission data $x_2$ from the transmission antenna $TX_2$.

The transmission data $x_1$ multiplied by the precoding weight $W_{11}$ and the transmission data $x_2$ multiplied by the precoding weight $W_{21}$ is added in an adder 23, and then, transmitted to a channel transmission path from the transmission antenna $TX_1$. Meanwhile, the transmission data $x_1$ multiplied by the precoding weight $W_{12}$ and the transmission data $x_2$ multiplied by the precoding weight $W_{22}$ is added in an adder 24, and then, transmitted to a channel transmission path from the transmission antenna $TX_2$.

The transmission data $x_1$ and $x_2$ transmitted from the transmission antennas $TX_1$ and $TX_2$ undergoes the effects of channel variations of the channel transmission paths formed in the reception antennas $RX_1$ and $RX_2$ of the mobile station apparatuses UE#1 and UE#2. In other words, the transmission data $x_1$ and $x_2$ transmitted from the transmission antenna $TX_1$ to the reception antenna $RX_1$ is multiplied by a channel state coefficient $h_{11}$, and the transmission data $x_1$ and $x_2$ transmitted from the transmission antenna $TX_1$ to the reception antenna $RX_2$ is multiplied by a channel state coefficient $h_{12}$. Similarly, the transmission data $x_1$ and $x_2$ transmitted from the transmission antenna $TX_2$ to the reception antenna $RX_1$ is multiplied by a channel state coefficient $h_{21}$, and the transmission data $x_1$ and $x_2$ transmitted from the transmission antenna $TX_2$ to the reception antenna $RX_2$ is multiplied by a channel state coefficient $h_{22}$.

The mobile station apparatuses UE#1 and UE#2 receive the transmission data $x_1$, $x_2$ as reception data $y_1$, $y_2$ via the reception antennas $RX_1$, $RX_2$. In this case, the reception data $y_1$, $y_2$ is respectively following values. Herein, $n_1$ and $n_2$ are noise components.

$$y_1 = h_{11}(W_{11}x_1 + W_{21}x_2) + h_{21}(W_{12}x_1 + W_{22}x_2) + n_1 =$$
$$(h_{11}W_{11} + h_{21}W_{12})x_1 + (h_{11}W_{21} + h_{21}W_{22})x_2 + n_1$$
$$y_2 = h_{12}(W_{11}x_1 + W_{21}x_2) + h_{22}(W_{12}x_1 + W_{22}x_2) + n_2 =$$
$$(h_{12}W_{11} + h_{22}W_{12})x_1 + (h_{12}W_{21} + h_{22}W_{22})x_2 + n_2$$

Based on the reception data $y_1$, $y_2$, each of the mobile station apparatuses UE#1 and UE#2 selects a PMI corresponding to a precoding weight that maximizes a reception SINR of the transmission data from each of the transmission antennas $T_{x1}$ and $T_{x2}$ of the base station apparatus eNode B. In this case, in the reception data $y_1$, $(h_{11}W_{11}+h_{21}W_{12})$ corresponds to signal power of the transmission data $x_1$ to the UE#1, and $(h_{11}W_{21}+h_{21}W_{22})$ corresponds to signal power of the transmission data $x_2$ to the other apparatus (mobile station apparatus UE#2). Therefore, the mobile station apparatus UE#1 selects a PMI corresponding to a precoding weight that increases the former power to a maximum, while decreasing the latter power to a minimum. Similarly, in the reception data $y_2$, $(h_{12}W_{21}+h_{22}W_{22})$ corresponds to signal power of the transmission data $x_2$ to the UE#2, and $(h_{12}W_{11}+h_{22}W_{12})$ corresponds to signal power of the transmission data $x_1$ to the other apparatus (mobile station apparatus UE#1). Therefore, the mobile station apparatus UE#2 selects a PMI corresponding to a precoding weight that increases the former power to a maximum, while decreasing the latter power to a minimum in the base station apparatus eNode B.

In thus selecting a PMI, each of the mobile station apparatuses UE#1 and UE2 selects a PMI corresponding to a single precoding weight among a plurality of precoding weights defined in the codebook suitable for SU-MIMO transmission. Therefore, such events occur that the PMI corresponding to the precoding weight that is not associated with the actual channel state is fed back as the channel information. The inventors of the invention noted the respect that the channel information that is not associated with the actual channel state is transmitted as feedback by thus transmitting the PMI corresponding to a single precoding weight defined in the codebook suitable for SU-MIMO transmission as feedback, and arrived at the invention.

A mobile station apparatus UE according to the invention newly generates a precoding matrix based on a plurality of precoding matrixes (precoding weights) defined in the codebook suitable for SU-MIMO transmission, and transmits information on the generated precoding matrix as the channel information to the base station apparatus eNode B as feedback. By this means, it is possible to actualize feedback of the channel information suitable for MU-MIMO transmission while exploiting the codebook suitable for SU-MIMO transmission.

Described herein is the information on the precoding matrix that is fed back as the channel information. The mobile station apparatus UE according to the invention newly generates a precoding matrix (hereinafter, referred to as a "generated precoding matrix" as appropriate) based on a plurality of precoding matrixes, while referring to a channel matrix corresponding to the actual channel state, and transmits the information used in generation of the generated precoding matrix as the channel information to the base station apparatus eNode B as feedback.

Described below is an example of the channel information that is transmitted from the mobile station apparatus UE to the base station apparatus eNode B as feedback according to the invention. In addition, in the following description, to simplify the description, the description is given with the above-mentioned precoding matrix and channel matrix made visible respectively as vector elements (precoding vector and channel vector).

Figure 2:
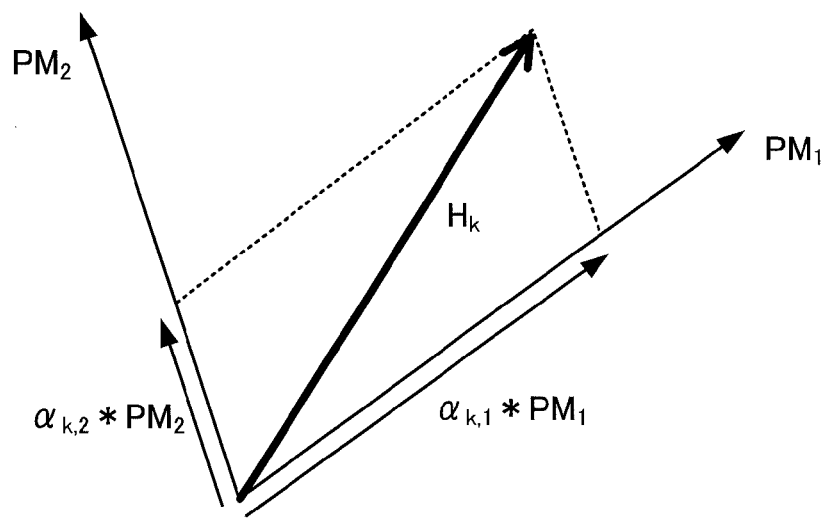
FIG. 2 is a conceptual diagram to explain an example of channel information transmitted from a mobile station apparatus as feedback according to the invention.

FIG. 2 is a conceptual diagram to explain an example of the channel information transmitted from the mobile station apparatus UE as feedback according to the invention. In FIG. 2, "$H_k$" represents a channel vector (channel matrix) corresponding to a channel state in a channel transmission path of a user k to undergo spatial multiplexing in MU-MIMO transmission, and "$PM_1$" and "$PM_2$" represent two precoding vectors (precoding matrixes) included in the codebook suitable for SU-MIMO transmission. Further, "$\alpha_{k,1}$" and "$\alpha_{k,2}$" represent adjustment coefficients to adjust lengths of the precoding vectors, and for example, are comprised of complex numbers.

As shown in FIG. 2, the mobile station apparatus UE according to the invention defines a channel vector $H_k$ corresponding to the channel state of the channel transmission path as a coupling (linear coupling) vector of adjusted vectors $\alpha_{k,1}*PM_1$", $\alpha_{k,2}*PM_2$ obtained by adjusting the lengths of a plurality (herein, two) of precoding vectors $PM_1$, $PM_2$ defined in the codebook suitable for SU-MIMO transmission by adjustment coefficients $\alpha_{k,1}$, $\alpha_{k,2}$. In addition, the coupling vector constitutes a vector corresponding to the generated precoding matrix as described above.

In other words, in the mobile station apparatus UE according to the invention, the channel vector $H_k$ corresponding to the channel state in the channel transmission path is defined by following (Eq.1). Herein, "M" represents the number of a plurality of precoding vectors selected from a plurality of precoding vectors defined in the codebook suitable for SU-MIMO transmission.

$$H_k \approx \alpha_{k,1}*PM_1 + \alpha_{k,2}*PM_2 + \ldots + \alpha_{k,M}*PM_M \quad (Eq.1)$$

The mobile station apparatus UE according to the invention transmits the precoding vectors $PM_1, PM_2, \ldots, PM_M$ and adjustment coefficients $\alpha_{k,1}, \alpha_{k,2}, \ldots, \alpha_{k,M}$ used in generation of thus defined coupling vector (channel vector $H_k$) as the channel information to the base station apparatus eNode B as feedback. In the example as shown in FIG. 2, the precoding vectors $PM_1$, $PM_2$ and adjustment coefficients $\alpha_{k,1}$, $\alpha_{k,2}$ are fed back to the base station apparatus eNode B as the channel information.

According to the mobile station apparatus UE according to the invention, the apparatus UE newly generates a precoding matrix based on a plurality of precoding matrixes defined in the codebook suitable for SU-MIMO transmission, transmits the information on the generated precoding matrix as the channel information to the base station apparatus eNode B as feedback, is thereby capable of transmitting the channel information in response to the actual channel state to the base station apparatus eNode B as feedback with higher accuracy as compared with the case of transmitting one precoding weight defined in the codebook suitable for SU-MIMO transmission as feedback, and is thus capable of performing feedback of the channel information suitable for MU-MIMO transmission.

Further, in the mobile station apparatus UE according to the invention, since the precoding matrixes defined in the codebook suitable for SU-MIMO transmission are used for feedback of the channel information, it is possible to effectively exploiting the codebook that defines the precoding matrixes suitable for SU-MIMO transmission. Therefore, since it is not necessary to newly specify the codebook suitable for MU-MIMO transmission or to perform processing for switching between codebooks, it is possible to improve the data rate in MU-MIMO transmission while maximizing utilization of the configuration of the LTE system.

Particularly, in the mobile station apparatus UE according to the invention, since the precoding vectors $PM_1, PM_2, \ldots, PM_M$ and adjustment coefficients $\alpha_{k,1}, \alpha_{k,2}, \ldots, \alpha_{k,M}$ used in generation of the channel vector $H_k$ defined by above-mentioned Eq.1 are used as the channel information, it is possible to notify the base station apparatus eNode B as feedback of the actual channel state in the channel transmission path by adding the low number of bits required for feedback.

Described next is a method of selecting the precoding matrixes (precoding vectors) $PM_1, PM_2, \ldots, PM_M$ and adjustment coefficients $\alpha_{k,1}, \alpha_{k,2}, \ldots, \alpha_{k,M}$ as the channel information transmitted as feedback in the mobile station apparatus UE according to the invention. As the technique for selecting the precoding matrixes $PM_1, PM_2, \ldots, PM_M$ and adjustment coefficients $\alpha_{k,1}, \alpha_{k,2}, \ldots, \alpha_{k,M}$, conceivable are method 1 of fixing one of the precoding vectors $PM_1$, $PM_2, \ldots, PM_M$ and adjustment coefficients $\alpha_{k,1}, \alpha_{k,2}, \ldots, \alpha_{k,M}$ while making the other one selectable, and method 2 of making both the precoding vectors $PM_1, PM_2, \ldots, PM_M$ and adjustment coefficients $\alpha_{k,1}, \alpha_{k,2}, \ldots, \alpha_{k,M}$ selectable.

Figure 3:
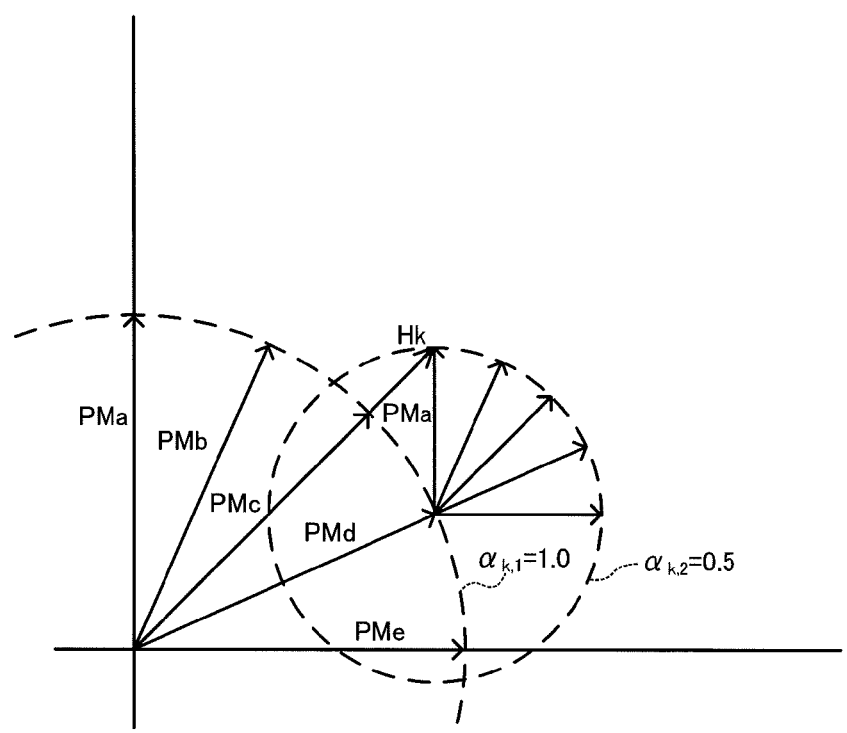
FIG. 3 is a conceptual diagram to explain processing in the case of fixing adjustment coefficients while making precoding vectors selectable in the mobile station apparatus according to the invention.

In the above-mentioned method 1, described is the case (method 1a) of fixing the adjustment coefficients $\alpha_{k,1}, \alpha_{k,2}, \ldots, \alpha_{k,M}$, while making the precoding matrixes $PM_1, PM_2, \ldots, PM_M$ selectable. FIG. 3 is a conceptual diagram to explain processing in the case of fixing the adjustment coefficients $\alpha_{k,1}, \alpha_{k,2}, \ldots, \alpha_{k,M}$, while making the precoding matrixes $PM_1, PM_2, \ldots, PM_M$ selectable. Herein, for convenience in description, described is the case of selecting two precoding matrixes $PM_1, PM_2$ from the codebook suitable for SU-MIMO transmission. For example, it is assumed that adjustment coefficients $\alpha_{k,1}, \alpha_{k,2}$ are respectively fixed to values of "1" and "0.5", and that the codebook defines precoding matrixes $PM_a, PM_b, PM_c, PM_d$, and $PM_e$.

In this case, as shown in FIG. 3, the mobile station apparatus UE according to the invention selects the precoding matrix $PM_d$ as the precoding matrix $PM_1$ to be multiplied by the adjustment coefficient $\alpha_{k,1}$ (=1), while selecting the precoding matrix $PM_a$ as the precoding matrix $PM_2$ to be multiplied by the adjustment coefficient $\alpha_{k,2}$ (=0.5). In other words, the channel matrix $H_k$ is defined as the coupling vector of the adjusted matrix $\alpha_{k,1}$ (=1)*$PM_d$ obtained by adjusting the precoding matrix $PM_d$ by the adjustment coefficient $\alpha_{k,1}$ and the adjusted matrix $\alpha_{k,2}*PM_a$ obtained by adjusting the precoding matrix $PM_a$ by the adjustment coefficient $\alpha_{k,2}$ (=0.5).

$$H_k \approx 1*PM_d + 0.5*PM_a$$

Then, the base station apparatus eNode B is provided with feedback of the adjustment coefficients $\alpha_{k,1}$ (=1), $\alpha_{k,2}$ (=0.5) and precoding matrixes $PM_d, PM_a$ used in the operation of thus obtained channel matrix $H_k$. In addition, herein, the adjustment coefficients $\alpha_{k,1}, \alpha_{k,2}$ that are fixed values are included in the subject of feedback, but it is preferable as the Embodiment that the adjustment coefficients $\alpha_{k,1}, \alpha_{k,2}$ are beforehand held in the base station apparatus eNode B and mobile station apparatus UE and are removed from the subject of feedback. In this case, it is possible to further decrease the number of bits required for feedback.

Figure 4:
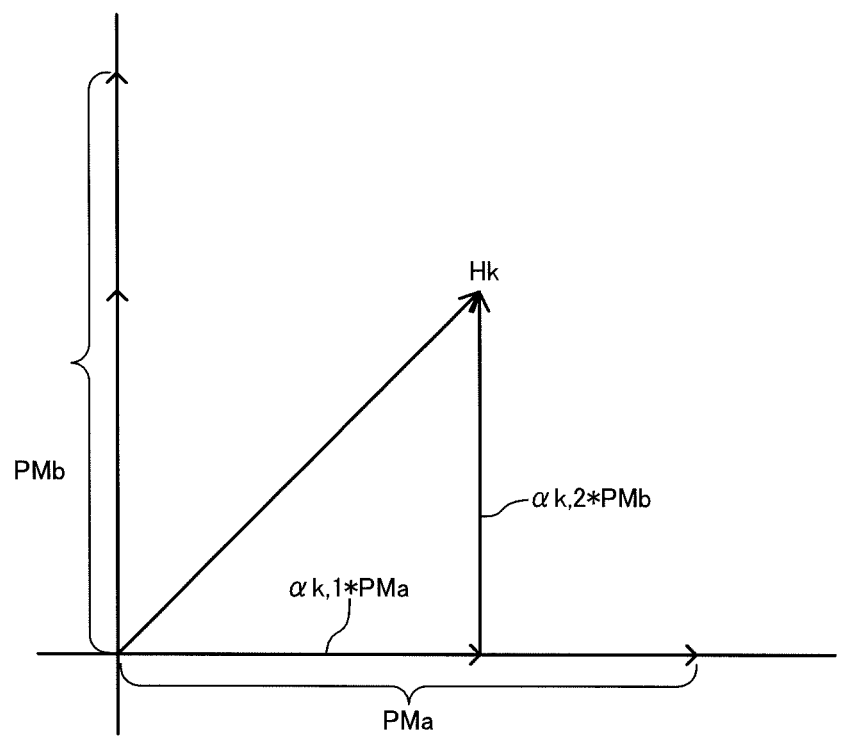
FIG. 4 is a conceptual diagram to explain processing in the case of fixing precoding vectors while making adjustment coefficients selectable in the mobile station apparatus according to the invention.

Next, in the above-mentioned method 1, described is the case (method 1b) of fixing the precoding matrixes $PM_1$, $PM_2, \ldots, PM_M$, while making the adjustment coefficients $\alpha_{k,1}, \alpha_{k,2}, \ldots, \alpha_{k,M}$ selectable. FIG. 4 is a conceptual diagram to explain processing in the case of fixing the precoding matrixes $PM_1, PM_2, \ldots, PM_M$, while making the adjustment coefficients $\alpha_{k,1}, \alpha_{k,2}, \ldots, \alpha_{k,M}$ selectable. Herein, for convenience in description, it is assumed that two precoding matrixes $PM_1, PM_2$ are fixed and that two adjustment coefficients $\alpha_{k,1}, \alpha_{k,2}$ associated with the matrixes are selected. For example, it is assumed that the precoding matrixes $PM_1$, $PM_2$ are respectively precoding matrixes $PM_a, PM_b$ shown in FIG. 4, and that the adjustment coefficients $\alpha_{k,1}, \alpha_{k,2}$ are selected from among beforehand determined values of "0.2", "0.4", "0.6", "0.8" and "1.0".

In this case, as shown in FIG. 4, the mobile station apparatus UE according to the invention selects "0.6" as the adjustment coefficient $\alpha_{k,1}$ to adjust the precoding matrix $PM_a$, while selecting "0.6" as the adjustment coefficient $\alpha_{k,2}$ to adjust the precoding matrix $PM_b$. In other words, the channel matrix $H_k$ is defined as the coupling vector of the adjusted matrix $\alpha_{k,1}$ (=0.6)*$PM_a$ obtained by adjusting the precoding matrix $PM_a$ by the adjustment coefficient $\alpha_{k,1}$ and the adjusted matrix $\alpha_{k,2}*PM_b$ obtained by adjusting the precoding matrix $PM_b$ by the adjustment coefficient $\alpha_{k,2}$ (=0.6).

$H_k \approx 0.6*PM_a + 0.6*PM_b$

Then, the base station apparatus eNode B is provided with feedback of the adjustment coefficients $\alpha_{k,1}$ (=0.6), $\alpha_{k,2}$ (=0.6) and precoding matrixes $PM_a$, $PM_b$ used in the operation of thus obtained channel matrix $H_k$. In addition, herein, the precoding matrixes $PM_a$, $PM_b$ that are fixed values are included in the subject of feedback, but it is preferable as the Embodiment that the precoding matrixes $PM_a$, $PM_b$ are beforehand held in the base station apparatus eNode B and mobile station apparatus UE and are removed from the subject of feedback. In this case, it is possible to further decrease the number of bits required for feedback.

In the above-mentioned method 2, in the same manner as in the precoding matrixes $PM_1, PM_2, \ldots, PM_M$ in the above-mentioned method 1a, the precoding matrixes $PM_1, PM_2, \ldots, PM_M$ are made selectable, while in the same manner as in the adjustment coefficients $\alpha_{k,1}, \alpha_{k,2}, \ldots, \alpha_{k,M}$ in the above-mentioned method 1b, the adjustment coefficients $\alpha_{k,1}, \alpha_{k,2}, \ldots, \alpha_{k,M}$ are made selectable. In the case of making both the precoding matrixes $PM_1, PM_2, \ldots, PM_M$ and the adjustment coefficients $\alpha_{k,1}, \alpha_{k,2}, \ldots, \alpha_{k,M}$ selectable, as compared with the case of fixing either the precoding matrixes $PM_1, PM_2, \ldots, PM_M$ or the adjustment coefficients $\alpha_{k,1}, \alpha_{k,2}, \ldots, \alpha_{k,M}$, it is possible to increase the degree of flexibility, the channel matrix $H_k$ can be obtained with higher accuracy, and it is made possible to transmit the feedback information corresponding the channel matrix $H_k$ to the base station apparatus eNode B as feedback.

In thus selecting information targeted for selection from among the precoding matrixes $PM_1, PM_2, \ldots, PM_M$ and the adjustment coefficients $\alpha_{k,1}, \alpha_{k,2}, \ldots, \alpha_{k,M}$ that are fed back as the channel information, in the mobile station apparatus UE, for example, it is possible to adopt one of arithmetic processing (hereinafter, referred to as "minimum chordal distance arithmetic processing") for minimizing the chordal distance between the above-mentioned generated precoding matrix and the channel matrix, arithmetic processing (hereinafter, referred to as "maximum reception SNR arithmetic processing") for maximizing the reception SNR in the mobile station apparatus UE, and arithmetic processing (hereinafter, referred to as "maximum reception SINR arithmetic processing") for maximizing the reception SINR in the mobile station apparatus UE.

In the minimum chordal distance arithmetic processing, the chordal distance between the generated precoding matrix and the channel matrix is calculated by (Eq.2).

$$d_{chord}(A, B) = \frac{1}{\sqrt{2}} \|AA^H - BB^H\|_F \quad (Eq.\ 2)$$

Herein, the generated precoding matrix is indicated by "matrix A", and the channel matrix is indicated by "matrix B".

The mobile station apparatus UE carries out an operation of all the combinations of the precoding matrixes $PM_1, PM_2, \ldots, PM_M$ and the adjustment coefficients $\alpha_{k,1}, \alpha_{k,2}, \ldots, \alpha_{k,M}$ which minimize the chordal distance, and obtains desired precoding matrixes $PM_1, PM_2, \ldots, PM_M$ and adjustment coefficients $\alpha_{k,1}, \alpha_{k,2}, \ldots, \alpha_{k,M}$. In the case of thus using the minimum chordal distance arithmetic processing, it is possible to select the precoding matrixes $PM_1, PM_2, \ldots, PM_M$ and the adjustment coefficients $\alpha_{k,1}, \alpha_{k,2}, \ldots, \alpha_{k,M}$ that enable generation of the generated precoding matrix that most approximates the channel matrix.

In the maximum reception SNR arithmetic processing, without considering interference among users to spatially multiplex in MU-MIMO transmission, the mobile station apparatus UE selects the precoding matrixes $PM_1, PM_2, \ldots, PM_M$ and the adjustment coefficients $\alpha_{k,1}, \alpha_{k,2}, \ldots, \alpha_{k,M}$ that maximize the reception SNR in the mobile station apparatus UE. For example, the mobile station apparatus UE carries out an operation of reception SNRs corresponding to all the combinations of the precoding matrixes $PM_1, PM_2, \ldots, PM_M$ and the adjustment coefficients $\alpha_{k,1}, \alpha_{k,2}, \ldots, \alpha_{k,M}$, and obtains precoding matrixes $PM_1, PM_2, \ldots, PM_M$ and adjustment coefficients $\alpha_{k,1}, \alpha_{k,2}, \ldots, \alpha_{k,M}$ that maximize the reception SNR. In the case of thus using the maximum reception SNR arithmetic processing, it is possible to select the precoding matrixes $PM_1, PM_2, \ldots, PM_M$ and adjustment coefficients $\alpha_{k,1}, \alpha_{k,2}, \ldots, \alpha_{k,M}$ based on the same principle as the processing for selecting the precoding matrix and PMI in the LTE-scheme system.

In the maximum reception SINR arithmetic processing, with consideration given to interference among users to spatially multiplex in MU-MIMO transmission, the mobile station apparatus UE selects the precoding matrixes $PM_1, PM_2, \ldots, PM_M$ and the adjustment coefficients $\alpha_{k,1}, \alpha_{k,2}, \ldots, \alpha_{k,M}$ that maximize the reception SINR in the mobile station apparatus UE. For example, the mobile station apparatus UE carries out an operation of reception SINRs corresponding to all the combinations of the precoding matrixes $PM_1, PM_2, \ldots, PM_M$ and the adjustment coefficients $\alpha_{k,1}, \alpha_{k,2}, \ldots, \alpha_{k,M}$, and obtains precoding matrixes $PM_1, PM_2, \ldots, PM_M$ and adjustment coefficients $\alpha_{k,1}, \alpha_{k,2}, \ldots, \alpha_{k,M}$ that maximize the reception SINR. In the case of thus using the maximum reception SINR arithmetic processing, since consideration is given to interference with the other users, it is possible to select the precoding matrixes $PM_1, PM_2, \ldots, PM_M$ and adjustment coefficients $\alpha_{k,1}, \alpha_{k,2}, \ldots, \alpha_{k,M}$ that are the most suitable for MU-MIMO transmission.

Further, in selecting the information targeted for selection from among the precoding matrixes $PM_1, PM_2, \ldots, PM_M$ and the adjustment coefficients $\alpha_{k,1}, \alpha_{k,2}, \ldots, \alpha_{k,M}$, by one of the minimum chordal distance arithmetic processing, the maximum reception SNR arithmetic processing and the maximum reception SINR arithmetic processing, it is possible to collectively select the precoding matrixes $PM_1, PM_2, \ldots, PM_M$ and/or the adjustment coefficients $\alpha_{k,1}, \alpha_{k,2}, \ldots, \alpha_{k,M}$, or to select sequentially. In other words, when the selection target is precoding matrixes $PM_1, PM_2, \ldots, PM_M$, precoding matrixes $PM_1, PM_2, \ldots, PM_M$ are concurrently selected in the case of collectively selecting the matrixes, while being successively selected in order of precoding matrixes $PM_1, PM_2, \ldots, PM_M$ in the case of sequentially selecting the matrixes.

The processing will be described below in the case of collectively or sequentially selecting the precoding matrixes $PM_1, PM_2, \ldots, PM_M$ and/or the adjustment coefficients $\alpha_{k,1}, \alpha_{k,2}, \ldots, \alpha_{k,M}$ in the mobile station apparatus UE. In addition, in the following description, for convenience in description, the description is given using the specific example (the example of fixing the adjustment coefficients $\alpha_{k,1}, \alpha_{k,2}, \ldots, \alpha_{k,M}$, while making the precoding matrixes $PM_1, PM_2, \ldots, PM_M$ selectable) as shown in FIG. 3.

In the example as shown in FIG. 3, since the adjustment coefficients $\alpha_{k,1}, \alpha_{k,2}$ are fixed, the precoding matrixes $PM_1$, $PM_2$ are collectively selected. In this case, as the precoding matrix $PM_1$ associated with the adjustment coefficient $\alpha_{k,1}$ (=1), one precoding matrix, $PM_d$, is selected from among five precoding matrixes $PM_a, PM_b, PM_c, PM_d$ and $PM_e$, and concurrently, as the precoding matrix $PM_2$ associated with the adjustment coefficient $\alpha_{k,\,2}$ (=0.5), one precoding matrix, $PM_a$, is selected from among five precoding matrixes $PM_a$, $PM_b$, $PM_c$, $PM_d$ and $PM_e$. In other words, in this case, it is possible to select desired precoding matrixes $PM_d$, $PM_a$ by the arithmetic processing of 25 (5×5) times.

As can be seen from this example, in the case of collectively selecting the precoding matrixes $PM_1$, $PM_2$, ..., $PM_M$ and/or the adjustment coefficients $\alpha_{k,\,1}$, $\alpha_{k,\,2}$, ..., $\alpha_{k,\,M}$, it is possible to include all the combinations of the precoding matrixes $PM_1$, $PM_2$, ..., $PM_M$ and/or the adjustment coefficients $\alpha_{k,\,1}$, $\alpha_{k,\,2}$, ..., $\alpha_{k,\,M}$ in the selection target, and it is thereby possible to select optimal precoding matrixes $PM_1$, $PM_2$, ..., $PM_M$ and/or adjustment coefficients $\alpha_{k,\,1}$, $\alpha_{k,\,2}$, ..., $\alpha_{k,\,M}$ as compared with the case of sequentially selecting the precoding matrixes $PM_1$, $PM_2$, ..., $PM_M$ and/or the adjustment coefficients $\alpha_{k,\,1}$, $\alpha_{k,\,2}$, ..., $\alpha_{k,\,M}$.

Meanwhile, in the example as shown in FIG. 3, in the case of sequentially selecting the precoding matrixes $PM_1$, $PM_2$, first, as the precoding matrix $PM_1$ associated with the adjustment coefficient $\alpha_{k,\,1}$ (=1), one precoding matrix, $PM_d$, is selected from among five precoding matrixes $PM_a$, $PM_b$, $PM_c$, $PM_d$ and $PM_e$. Then, as the precoding matrix $PM_2$ associated with the adjustment coefficient $\alpha_{k,\,2}$, one precoding matrix, $PM_a$, is selected from among five precoding matrixes $PM_a$, $PM_b$, $PM_c$, $PM_d$ and $PM_e$. In other words, in this case, it is possible to select precoding matrixes $PM_d$, $PM_a$ by the arithmetic processing of 10 (5+5) times.

As can be seen from this example, in the case of sequentially selecting the precoding matrixes $PM_1$, $PM_2$, ..., $PM_M$ and/or the adjustment coefficients $\alpha_{k,\,1}$, $\alpha_{k,\,2}$, ..., $\alpha_{k,\,M}$, it is possible to decrease the number of the precoding matrixes (adjustment coefficients) included in a selection target at a time, and it is thereby possible to reduce the arithmetic processing in the mobile station apparatus UE as compared with the case of collectively selecting the precoding matrixes $PM_1$, $PM_2$, ..., $PM_M$ and/or the adjustment coefficients $\alpha_{k,\,1}$, $\alpha_{k,\,2}$, ..., $\alpha_{k,\,M}$.

An Embodiment of the invention will specifically be described below with reference to accompanying drawings. Described herein is the case of using the base station apparatus and mobile station apparatus that support the LTE-A system.

Figure 5:
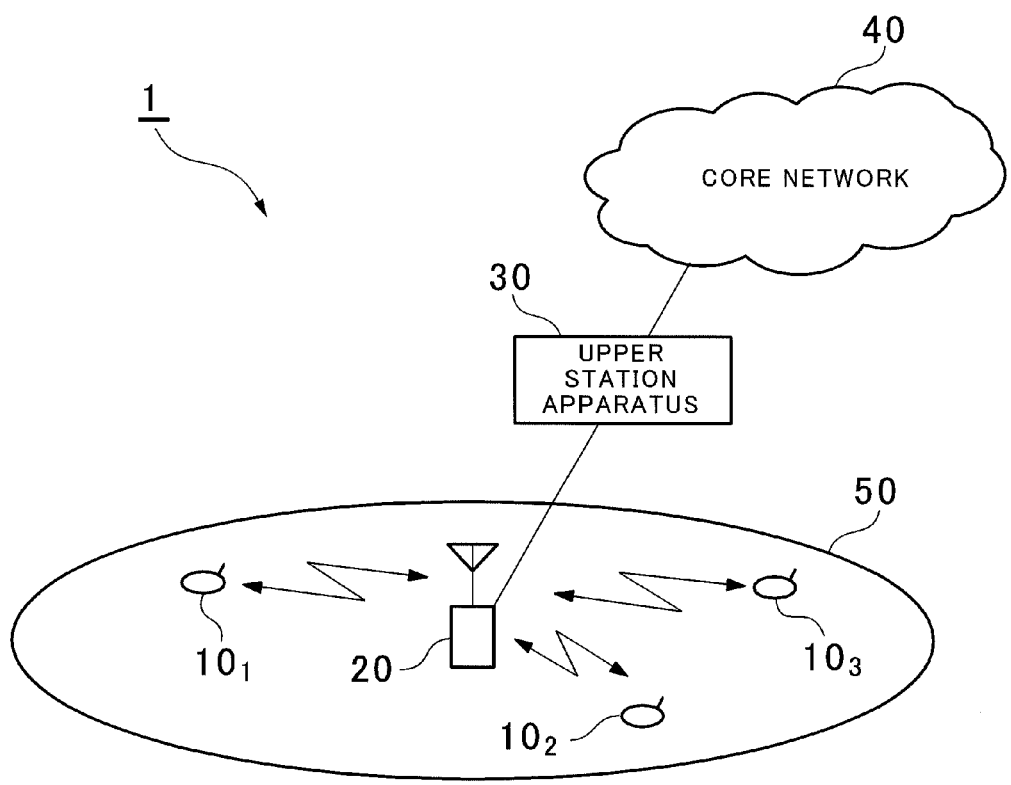
FIG. 5 is a diagram to explain a configuration of a mobile communication system according to an Embodiment of the invention.

Referring to FIG. 5, described is a mobile communication system 1 having mobile station apparatuses (UEs) 10 and base station apparatus (eNode B) 20 according to one Embodiment of the invention. FIG. 5 is a diagram to explain a configuration of the mobile communication system 1 having mobile station apparatuses 10 and base station apparatus 20 according to the Embodiment of the invention. In addition, for example, the mobile communication system 1 as shown in FIG. 5 is a system including the LTE system or Super 3G. Further, the mobile communication system 1 may be called IMT-Advanced or may be called 4G.

As shown in FIG. 5, the mobile communication system 1 includes a base station apparatus 20 and a plurality of mobile station apparatuses 10 ($10_1$, $10_2$, $10_3$, ... $10_n$, n is an integer where n>0) that communicate with the base station apparatus 20, and is comprised thereof. The base station apparatus 20 is connected to an upper station apparatus 30, and the upper station apparatus 30 is connected to a core network 40. The mobile station apparatuses 10 communicate with the base station apparatus 2 in a cell 50. In addition, for example, the upper station apparatus 30 includes an access gateway apparatus, Radio Network Controller (RNC), Mobility Management Entity (MME) and the like, but is not limited thereto.

Each of the mobile station apparatuses ($10_1$, $10_2$, $10_3$, ... $10_n$) has the same configuration, function and state, and is described as a mobile station apparatus 10 unless otherwise specified in the following description. Further, for convenience in description, the description is given while assuming that equipment which performs radio communication with the base station apparatus 20 is the mobile station apparatus 10, and more generally, the equipment may be user equipment (UE) including mobile terminal apparatuses and fixed terminal apparatuses.

In the mobile communication system 1, as a radio access scheme, OFDMA (Orthogonal Frequency Division Multiple Access) is applied in downlink, while SC-FDMA (Single-Carrier Frequency Division Multiple Access) is applied in uplink. OFDMA is a multicarrier transmission scheme for dividing a frequency band into a plurality of narrow frequency bands (subcarriers), and mapping data to each subcarrier to perform communication. SC-FDMA is a single-carrier transmission scheme for dividing the system band into bands comprised of a single or consecutive resource blocks for each terminal so that a plurality of terminals uses mutually different bands, and thereby reducing interference among the terminals.

Described herein are communication channels in the LTE system. In downlink, used are the PDSCH shared among the mobile station apparatuses 10, and downlink L1/L2 control channel (PDCCH, PCFICH, PHICH). User data i.e. normal data signals are transmitted on the PDSCH. The transmission data is included in the user data. In addition, a CC assigned to a mobile station apparatus 10 in the base station apparatus 20 and scheduling information is notified to the mobile station apparatus 10 on the L1/L2 control channel.

In uplink, used are the PUSCH (Physical Uplink Shared Channel) shared among the mobile station apparatuses 10, and the PUCCH (Physical Uplink Control Channel) that is a control channel in uplink. User data is transmitted on the PUSCH. Meanwhile, radio quality information (CQI: Channel Quality Indicator) in downlink and the like are transmitted on the PUCCH.

Figure 6:
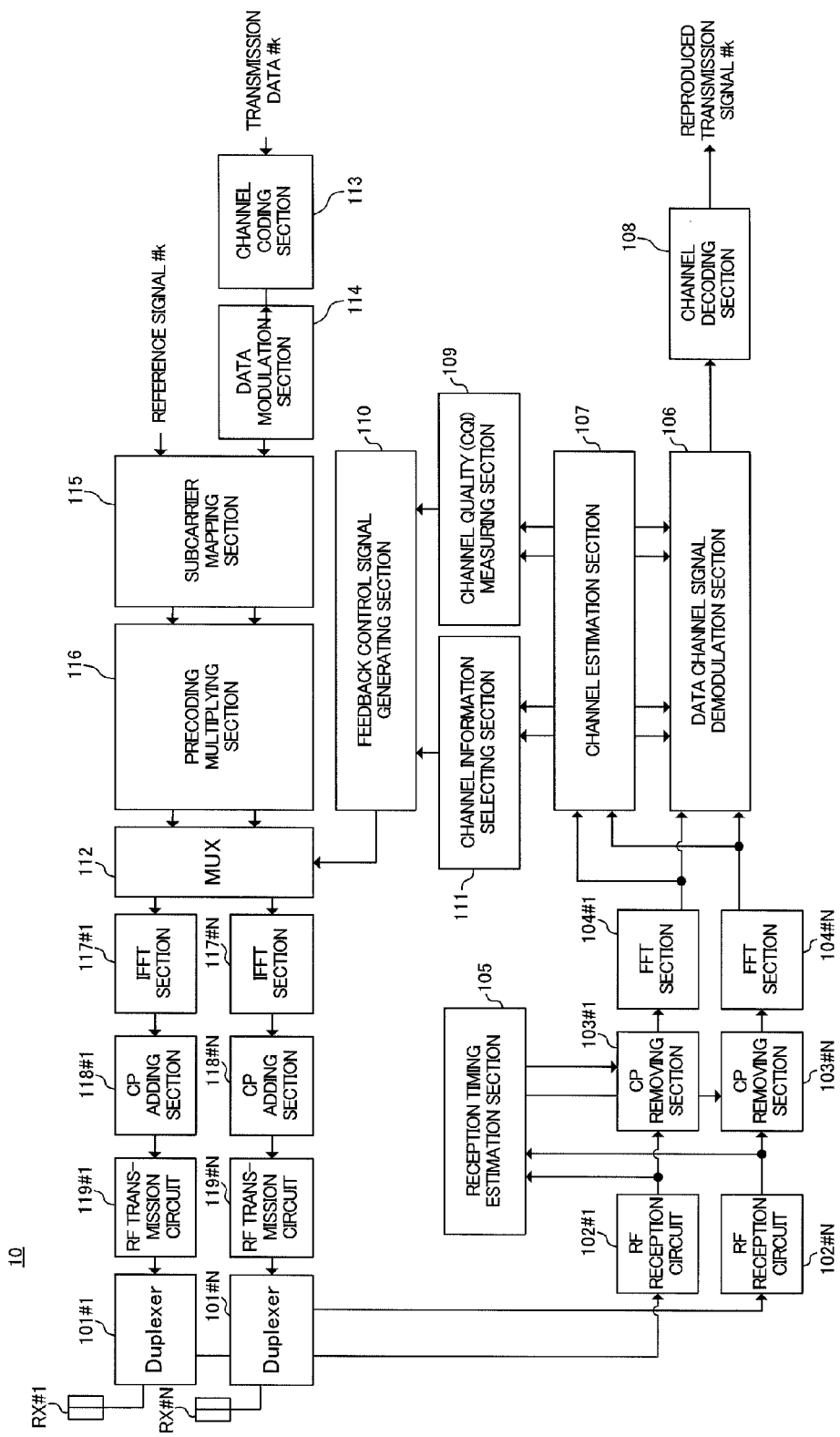
FIG. 6 is a block diagram illustrating a configuration of a mobile station apparatus according to the Embodiment.
Figure 7:
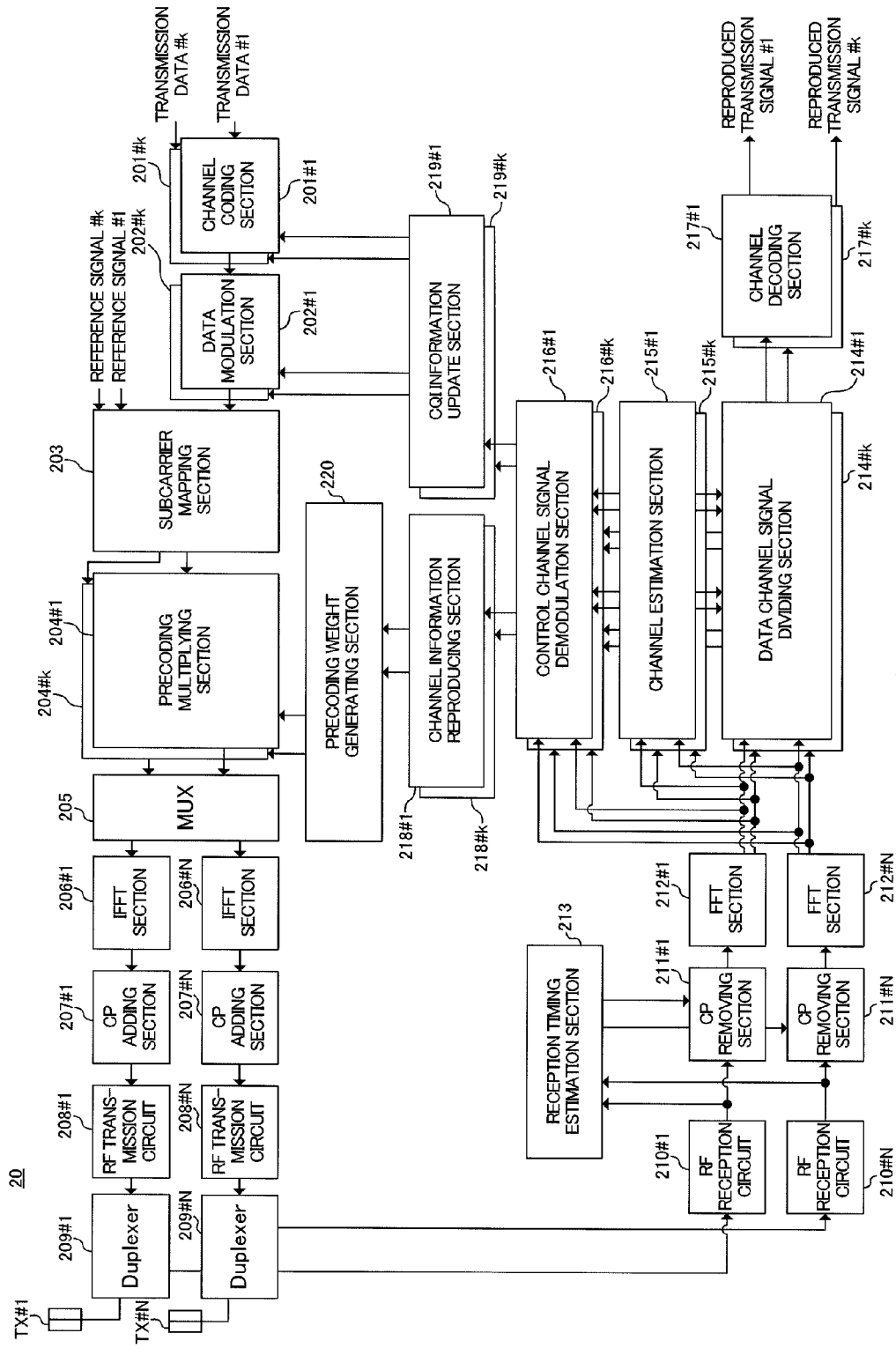
FIG. 7 is a block diagram illustrating a configuration of a base station apparatus according to the Embodiment.

FIG. 6 is a block diagram illustrating a configuration of the mobile station apparatus 10 according to this Embodiment. FIG. 7 is a block diagram illustrating a configuration of the base station apparatus 20 according to this Embodiment. In addition, the configurations of the mobile station apparatus 10 and the base station apparatus 20 as shown in FIGS. 6 and 7 are simplified to explain the invention, and are assumed to have the configurations that a normal mobile station apparatus and base station apparatus have, respectively.

In the mobile station apparatus 10 as shown in FIG. 6, transmission signals transmitted from the base station apparatus 20 are received in reception antennas RX#1 to RX#N, electrically divided into transmission paths and reception paths in duplexers 101#1 to 101#N, and then, output to RF reception circuits 102#1 to 102#N. Then, the signals undergo frequency conversion processing for converting a radio-frequency signal into a baseband signal in the RF reception circuits 102#1 to 102#N. CPs are removed from the baseband signals subjected to the frequency conversion processing in cyclic prefix (CP) removing sections 103#1 to 103 #N, and the resultants are output to Fast Fourier Trans form sections (FFT sections) 104#1 to 104#N. A reception timing estimation section 105 estimates reception timing from reference signals included in the reception signals, and notifies the CP removing sections 103#1 to 103#N of the estimation result. The FFT sections 104#1 to 104#N perform Fourier transform on the input reception signals, and transform the time-series signals into the signals in the frequency domain. The reception signals transformed into the signals in the frequency domain are output to a data channel signal demodulation section 106.

The data channel signal demodulation section 106 divides the reception signals input from the FFT sections 104#1 to 104#N, for example, by Minimum Mean Square Error (MMSE) or Maximum Likelihood Detection (MLD) signal division method. By this means, the reception signals coming from the base station apparatus 20 are divided into reception signals concerning users #1 to #k, and a reception signal concerning a user (herein, assumed to be a user k) of the mobile station apparatus 10 is extracted. A channel estimation section 107 estimates channel states from reference signals included in the reception signals output from the FFT sections 104#1 to 104#N, and notifies the estimated channel states to the data channel signal demodulation section 106, and a channel quality measuring section 109 and channel information selecting section 111, described later. The data channel signal demodulation section 106 divides the reception signals by the above-mentioned MLD signal division method based on the notified channel states. By this means, the reception signal concerning the user k is demodulated.

In addition, it is assumed that the extracted reception signal concerning the user k is demapped in a subcarrier demapping section, not shown, and is restored to the time-series signal, prior to the demodulation processing in the data channel signal demodulation section 106. The reception signal concerning the user k demodulated in the data channel signal demodulation section 106 is output to a channel decoding section 108. Then, the channel decoding section 108 performs channel decoding processing, and a transmission signal #k is thus reproduced.

The channel quality measuring section 109 measures channel quality (CQI) based on the channel states notified from the channel estimation section 107. Then, the section 109 notifies a feedback control signal generating section 110 of a CQI that is the measurement result. The channel information selecting section 111 constitutes the selection section, and based on the channel states notified from the channel estimation section 107, selects the precoding matrixes $PM_1, PM_2, \ldots, PM_M$ and/or the adjustment coefficients $\alpha_{k,1}, \alpha_{k,2}, \ldots, \alpha_{k,M}$ by one of a plurality of aspects as described above. Then, the section 111 notifies the feedback control signal generating section 110 of the selected precoding matrixes $PM_1, PM_2, \ldots, PM_M$ and/or adjustment coefficients $\alpha_{k,1}, \alpha_{k,2}, \ldots, \alpha_{k,M}$.

For example, the channel information selecting section 111 fixes one of precoding matrixes $PM_1, PM_2, \ldots, PM_M$ and the adjustment coefficients $\alpha_{k,1}, \alpha_{k,2}, \ldots, \alpha_{k,M}$ while selecting the other one (method 1). Alternatively, the section 111 selects both the precoding matrixes $PM_1, PM_2, \ldots, PM_M$ and the adjustment coefficients $\alpha_{k,1}, \alpha_{k,2}, \ldots, \alpha_{k,M}$ (method 2). In selecting the precoding matrixes $PM_1, PM_2, \ldots, PM_M$ and the adjustment coefficients $\alpha_{k,1}, \alpha_{k,2}, \ldots, \alpha_{k,M}$, it is possible to select by any arithmetic processing of the minimum chordal distance arithmetic processing, the maximum reception SNR arithmetic processing and the maximum reception SINR arithmetic processing. Further, it is also possible to switch between collective selection and sequential selection on the precoding matrixes $PM_1, PM_2, \ldots, PM_M$ and the adjustment coefficients $\alpha_{k,1}, \alpha_{k,2}, \ldots, \alpha_{k,M}$.

Based on the notified CQI, and the precoding matrixes $PM_1, PM_2, \ldots, PM_M$ and/or the adjustment coefficients $\alpha_{k,1}, \alpha_{k,2}, \ldots, \alpha_{k,M}$, the feedback control signal generating section 110 generates a control signal (for example, PUCCH) to transmit the CQI and the matrixes and/or coefficients to the base station apparatus 20 as feedback. In this case, the control signal as feedback includes the precoding matrixes $PM_1$, $PM_2, \ldots, PM_M$ and/or the adjustment coefficients $\alpha_{k,1}, \alpha_{k,2}, \ldots, \alpha_{k,M}$ selected in the channel information selecting section 111. The control signal generated in the feedback control signal generating section 110 is output to a multiplexer (MUX) 112.

Transmission data #k concerning the user #k output from a higher layer is subjected to channel coding in a channel coding section 113, and is subjected to data modulation in a data modulation section 114. The transmission data #k subjected to data modulation in the data modulation section 114 is transformed from the time-series signal into the signal in the frequency domain in a serial/parallel transform section, not shown, and is output to a subcarrier mapping section 115.

The subcarrier mapping section 115 maps the transmission data #k to subcarriers corresponding to scheduling information indicated from the base station apparatus 20. At this point, the subcarrier mapping section 115 maps (multiplexes) a reference signal #k generated in a reference signal generating section, not shown, to the subcarriers together with the transmission data #k. The transmission data #k thus mapped to the subcarriers is output to a precoding multiplying section 116.

The precoding multiplying section 107 shifts the phase and/or amplitude of the transmission data #k for each of the reception antennas RX#1 to RX#N based on the precoding weights obtained from the precoding matrixes $PM_1$, $PM_2, \ldots, PM_M$ and/or the adjustment coefficients $\alpha_{k,1}, \alpha_{k,2}, \ldots, \alpha_{k,M}$ selected in the channel information selecting section 111. The transmission data #k with the phase and/or amplitude shifted in the precoding multiplying section 116 is output to the multiplexer (MUX) 112.

The multiplexer (MUX) 112 combines the transmission data #k with the phase and/or amplitude shifted and the control signal generated in the feedback control signal generating section 110, and generates transmission signals for each of the reception antennas RX#1 to RX#N. The transmission signals generated in the multiplexer (MUX) 112 are subjected to inverse fast Fourier transform in inverse fast Fourier transform sections 117, transformed from the signals in the frequency domain into the signals in the time domain, then provided with CPs in CP adding sections 118#1 to 118#N, and output to RF transmission circuits 119#1 to 119#N. Then, the RF transmission circuits 119#1 to 119#N perform frequency conversion processing for converting into the radio frequency band on the signals to output to the reception antennas RX#1 to RX#N via the duplexers 101#1 to 101#N, and the signals are transmitted from the reception antennas RX#1 to RX#N to the base station apparatus 20 in uplink.

Thus, the mobile station apparatus 10 according to this Embodiment selects the precoding matrixes $PM_1, PM_2, \ldots, PM_M$ and/or the adjustment coefficients $\alpha_{k,1}, \alpha_{k,2}, \ldots, \alpha_{k,M}$ by any of a plurality of aspects as described above, based on the channel states notified from the channel estimation section 107, transmits these pieces of information to the base station apparatus 20 as feedback, and is thereby capable of transmitting the channel information in response to the actual channel state to the base station apparatus 20 as feedback, and it is thus made possible to transmit the channel information suitable for MU-MIMO transmission to the base station apparatus 20 as feedback.

In the base station apparatus 20 as shown in FIG. 7, a scheduler, not shown, determines the number of users (the number of multiplexed users) to multiplex based on channel estimation values provided from channel estimation sections 215#1 to 215#k, described later. Then, the scheduler determines the resource allocation content (scheduling information) of uplink and downlink to each user, and outputs transmission data #1 to #k to users #1 to #k to corresponding channel coding sections 201#1 to 201#k.

The transmission data #1 to #k is subjected to channel coding in the channel coding sections 201#1 to 201#k, then output to data modulation sections 202#1 to 202#k, and is subjected to data modulation. At this point, channel coding and data modulation is performed based on the channel coding rate and modulation scheme provided from CQI information update sections 219#1 to 219#k, described later. The transmission data #1 to #k subjected to data modulation in the data modulation sections 202#1 to 202#k is subjected to inverse Fourier transform in discrete Fourier transform sections, not shown, and transformed from the time-series signals into the signals in the frequency domain, and the signals are output to a subcarrier mapping section 203.

The subcarrier mapping section 203 maps the transmission data #1 to #k to subcarriers corresponding to scheduling information provided from the scheduler. At this point, the subcarrier mapping section 203 maps (multiplexes) reference signals #1 to #k input from a reference signal generating section, not shown, to the subcarriers together with the transmission data #1 to #k. The transmission data #1 to #k thus mapped to the subcarriers is output to precoding multiplying sections 204#1 to 204#k.

The precoding multiplying sections 204#1 to 204#k shift the phases and/or amplitude of the transmission data #1 to #k for each of transmission antennas TX#1 to TX#N based on the precoding weights provided from a precoding weight generating section 220, described later (weighting of the transmission antennas TX#1 to TX#N by precoding). The transmission data #1 to #k with the phases and/or amplitude shifted in the precoding multiplying sections 204#1 to 204#k is output to the multiplexer (MUX) 205.

The multiplexer (MUX) 205 combines the transmission data #1 to #k with the phases and/or amplitude shifted, and generates transmission signals for each of the transmission antennas TX#1 to TX#N. The transmission signals generated in the multiplexer (MUX) 205 are subjected to inverse fast Fourier transform in inverse fast Fourier transform sections 206#1 to 206#N, and transformed from the signals in the frequency domain into the signals in the time domain. Then, the signals are provided with CPs in cyclic prefix (CP) adding sections 207#1 to 207#N, and output to RF transmission circuits 208#1 to 208#N. Then, the RF transmission circuits 208#1 to 208#N perform frequency conversion processing for converting into the radio frequency band on the signals to output to the transmission antennas TX#1 to TX#N via the duplexers 209#1 to 209#N, and the signals are transmitted from the transmission antennas TX#1 to TX#N to the mobile station apparatuses 10 in downlink.

Meanwhile, transmission signals transmitted from the mobile station apparatuses 10 in uplink are received in the transmission antennas TX#1 to TX#N, electrically divided into transmission paths and reception paths in the duplexers 209#1 to 209#N, and then, output to RF reception circuits 210#1 to 210#N. Then, the signals undergo frequency conversion processing for converting a radio-frequency signal into a baseband signal in the RF reception circuits 210#1 to 210#N. CPs are removed from the baseband signals subjected to the frequency conversion processing in CP removing sections 211#1 to 211#N, and the resultants are output to Fast Fourier Transform sections (FFT sections) 212#1 to 212#N. A reception timing estimation section 213 estimates reception timing from reference signals included in the reception signals, and notifies the CP removing sections 211#1 to 211#N of the estimation result. The FFT sections 212#1 to 212#N perform Fourier transform on the input reception signals, and transform the time-series signals into the signals in the frequency domain. The reception signals transformed into the signals in the frequency domain are output to data channel signal dividing sections 214#1 to 214#k.

The data channel signal dividing sections 214#1 to 214#k divide the reception signals input from the FFT sections 212#1 to 212#k, for example, by Minimum Mean Square Error (MMSE) or Maximum Likelihood Detection (MLD) signal division method. By this means, the reception signals coming from the mobile station apparatuses 10 are divided into reception signals concerning users #1 to #k. The channel estimation sections 215#1 to 215#k estimate channel states from reference signals included in the reception signals output from the FFT sections 212#1 to 212#k, and notify the estimated channel states to the data channel signal dividing sections 214#1 to 214#k, and control channel signal demodulation sections 216#1 to 216#k. The data channel signal dividing sections 214#1 to 214#k divide the reception signals by the above-mentioned MLD signal division method based on the notified channel states.

The reception signals concerning the users #1 to #k divided in the data channel signal dividing sections 214#1 to 214#k are demapped in subcarrier demapping sections, not shown, restored to the time-series signals, and then, are subjected to data demodulation in data demodulation sections, not shown. Then, channel decoding sections 217#1 to 217#k perform channel decoding processing, and transmission signals #1 to #k are thus reproduced.

The control channel signal demodulation sections 216#1 to 216#k demodulate control channel signals (for example, PDCCH) included in the reception signals input from the FFT sections 212#1 to 212#k. At this point, the control channel signal demodulation sections 216#1 to 216#k demodulate control channel signals respectively associated with the users #1 to #k. At this point, the control channel signal demodulation sections 216#1 to 216#k demodulate the control channel signals based on the channel states notified from the channel estimation sections 215#1 to 215#k. The control channel signals demodulated in the control channel signal demodulation sections 216#1 to 216#k are output to channel information reproducing sections 218#1 to 218#k and CQI information update sections 219#1 to 219#k, respectively.

The channel information reproducing sections 218#1 to 218#k reproduce information (channel information) on the channels from information included in respective control channel signals (for example, PUCCH) input from the control channel signal demodulation sections 216#1 to 216#k. More specifically, the sections 218#1 to 218#k reproduce the precoding matrixes $PM_1$, $PM_2$, ..., $PM_M$ and/or the adjustment coefficients $\alpha_{k,1}, \alpha_{k,2}, \ldots, \alpha_{k,M}$ as the channel information from the information included in the control channel signals (for example, PUCCH). The channel information reproduced by the channel information reproducing sections 218#1 to 218#k is output to a precoding weight generating section 220.

Based on the channel information (the precoding matrixes $PM_1, PM_2, \ldots, PM_M$ and/or the adjustment coefficients $\alpha_{k,1}, \alpha_{k,2}, \ldots, \alpha_{k,M}$) input from the channel information reproducing sections 218#1 to 218#k, the precoding weight generating section 220 generates precoding weights indicative of the phase and/or amplitude shift amounts for the transmission data #1 to #k. The generated precoding weights are output to the precoding multiplying sections 204#1 to 204#k, and used in precoding of the transmission data #1 to #k.

The CQI information update sections 219#1 to 219#k measure CQIs from the reference signals included in respective control channel signals (for example, PUCCH) input from the control channel signal demodulation sections 216#1 to 216#k, while always updating the CQI information to the latest state. The CQI information updated in the CQI information update sections 219#1 to 219#k is output to the channel coding sections 201#1 to 201#k and data modulation sections 202#1 to 202#k, respectively.

Thus, according to the base station apparatus 20 according to this Embodiment, the channel information reproducing sections 218#1 to 218#k reproduce the precoding matrixes $PM_1, PM_2, \ldots, PM_M$ and/or the adjustment coefficients $\alpha_{k,1}, \alpha_{k,2}, \ldots, \alpha_{k,M}$ as the channel information, the precoding weight generating section 220 generates precoding weights indicative of the phase and/or amplitude shift amounts for the transmission data 441 to #k based on the channel information (the precoding matrixes $PM_1, PM_2, \ldots, PM_M$ and/or the adjustment coefficients $\alpha_{k,1}, \alpha_{k,2}, \ldots, \alpha_{k,M}$), it is thereby possible to generate precoding weights in response to the actual channel states with higher accuracy, and it is thus made possible to increase the data rate in MU-MIMO transmission.

As described above, the mobile station apparatus 10 according to this Embodiment newly generates a precoding matrix based on a plurality of precoding matrixes defined in the codebook suitable for SU-MIMO transmission, transmits the information on the generated precoding matrix as the channel information to the base station apparatus 20 as feedback, is thereby capable of transmitting the channel information in response to actual channel state to the base station apparatus 20 as feedback with higher accuracy as compared with the case of transmitting one precoding weight defined in the codebook suitable for SU-MIMO transmission, and is thus capable of performing feedback of the channel information suitable for MU-MIMO transmission.

In the above-mentioned descriptions, the invention is specifically described using the above-mentioned Embodiment, but it is obvious to a person skilled in the art that the invention is not limited to the Embodiment described in the Description. The invention is capable of being carried into practice as modified and changed aspects without departing from the subject matter and scope of the invention defined by the descriptions of the scope of the claims. Accordingly, the descriptions of the Description are intended for illustrative explanation, and do not have any restrictive meaning to the invention.

The mobile station apparatus 10 according to the above-mentioned Embodiment defines the channel vector (channel matrix) $H_k$ by above-mentioned (Eq.1), and transmits the precoding vectors (precoding matrixes) $PM_1, PM_2, \ldots, PM_M$ and/or the adjustment coefficients $\alpha_{k,1}, \alpha_{k,2}, \ldots, \alpha_{k,M}$ used in generation of the channel vector $H_k$ as the channel information to the base station apparatus 20 as feedback. In the case of thus transmitting a plurality of pieces of channel information to the base station apparatus 20 as feedback, reducing the information amount of the channel information is preferable as an Embodiment.

For example, it is conceivable to fix a value of the adjustment coefficient $\alpha_{k,1}$ to "1" by normalizing (making a unit matrix) the channel matrix $H_k$ to eliminate the need of feedback of the adjustment coefficient $\alpha_{k,1}$. In this case, it is possible to reduce the information amount of the channel information in performing feedback of the adjustment coefficients $\alpha_{k,1}, \alpha_{k,2}, \ldots, \alpha_{k,M}$ as the channel information. For example, normalization (unit matrix) of the channel matrix $H_k$ is obtained by (Eq.3). Herein, "$H_k'$" represents a normalized channel matrix $H_k'$.

$$H_k' \approx H_k / \|H_k\| \tag{Eq.3}$$

In this case, the normalized channel matrix $H_k'$ is defined by (Eq.4) in the mobile station apparatus 10.

$$H_k' \approx PM_1 \alpha_{k,2} * PM_2 + \ldots + \alpha_{k,M} * PM_M \tag{Eq.4}$$

Then, the mobile station apparatus 10 transmits the precoding vectors $PM_1, PM_2, \ldots, PM_M$ and adjustment coefficients $\alpha_{k,2}, \ldots, \alpha_{k,M}$ used in generation of thus defined channel vector matrix $H_k'$ as the channel information to the base station apparatus 20 as feedback. By this means, as compared with the channel information according to the above-mentioned Embodiment, it is possible to reduce the information amount of the channel information in performing feedback of the adjustment coefficients or $\alpha_{k,2}, \ldots, \alpha_{k,M}$.

Also in the case of thus omitting the adjustment coefficient $\alpha_{k,1}$ among the adjustment coefficients $\alpha_{k,1}, \alpha_{k,2}, \ldots, \alpha_{k,M}$ transmitted as the channel information as feedback, the base station apparatus 20 receives feedback of the CQI separately from these pieces of channel information, and is thereby capable of estimating a value of the omitted adjustment coefficient $\alpha_{k,1}$, and it is thereby possible to obtain the same effect as in the case of obtaining the channel information according to the above-mentioned Embodiment.

The present application is based on Japanese Patent Application No. 2010-010058 filed on Jan. 20, 2010, entire content of which is expressly incorporated by reference herein.

The invention claimed is:

1. A mobile station apparatus configured to define a channel matrix corresponding to a channel transmission path suitable for MU-MIMO transmission using a plurality of precoding matrixes defined in a codebook suitable for SU-MIMO transmission and a plurality of adjustment coefficients to respectively adjust the plurality of precoding matrixes, comprising:

a selection section configured to define the channel matrix as a linear coupling vector of adjusted vectors obtained by adjusting the lengths of the plurality of precoding vectors defined in the codebook suitable for SU-MIMO transmission by the adjustment coefficients and select the plurality of precoding matrixes and/or the plurality of adjustment coefficients used in generation of the thus defined channel matrix; and a transmission section configured to transmit the plurality of precoding matrixes and/or the plurality of adjustment coefficients selected in the selection section to a base station apparatus as channel information suitable for MU-MIMO transmission.

2. The mobile station apparatus according to claim 1, wherein the mobile station apparatus defines the channel matrix as an addition matrix obtained by adding the plurality of precoding matrixes adjusted with the plurality of adjustment coefficients, and the selection section selects the plurality of precoding matrixes and/or the plurality of adjustment coefficients used in generation of the addition matrix that most approximates the channel matrix.

3. The mobile station apparatus according to claim 2, wherein the selection section beforehand fixes values of the plurality of adjustment coefficients, while selecting the plurality of precoding matrixes adjusted with the plurality of adjustment coefficients.

4. The mobile station apparatus according to claim 2, wherein the selection section beforehand fixes the plurality of precoding matrixes, while selecting values of the plurality of adjustment coefficients to adjust the plurality of precoding matrixes.

5. The mobile station apparatus according to claim 2, wherein the selection section selects the plurality of precoding matrixes and/or the plurality of adjustment coefficients that minimize a chordal distance between the channel matrix and the addition matrix.

6. The mobile station apparatus according to claim 5, wherein the selection section collectively selects the plurality of precoding matrixes and/or the plurality of adjustment coefficients.

7. The mobile station apparatus according to claim 5, wherein the selection section sequentially selects the plurality of precoding matrixes and/or the plurality of adjustment coefficients.

8. The mobile station apparatus according to claim 2, wherein the selection section selects the plurality of precoding matrixes and/or the plurality of adjustment coefficients that maximize a reception SNR in the mobile station apparatus.

9. The mobile station apparatus according to claim 2, wherein the selection section selects the plurality of precoding matrixes and/or the plurality of adjustment coefficients that maximize a reception SINR in the mobile station apparatus.

10. The mobile station apparatus according to claim 1, wherein the mobile station apparatus defines the channel matrix normalized as an addition matrix obtained by adding the plurality of precoding matrixes adjusted with the plurality of adjustment coefficients, and the selection section selects the plurality of precoding matrixes and/or the plurality of adjustment coefficients used in generation of the addition matrix that most approximates the channel matrix, while omitting selection of a part of the plurality of precoding matrixes and/or the plurality of adjustment coefficients.

11. A channel information feedback method for defining a channel matrix corresponding to a channel transmission path suitable for MU-MIMO transmission using a plurality of precoding matrixes defined in a codebook suitable for SU-MIMO transmission and a plurality of adjustment coefficients to respectively adjust the plurality of precoding matrixes, comprising:
 defining the channel matrix as a linear coupling vector of adjusted vectors obtained by adjusting the lengths of the plurality of precoding vectors defined in the codebook suitable for SU-MIMO transmission by the adjustment coefficients;
 selecting the plurality of precoding matrixes and/or the plurality of adjustment coefficients used in generation of the thus defined channel matrix; and
 transmitting the plurality of precoding matrixes and/or the plurality of adjustment coefficients that are selected to a base station apparatus as channel information suitable for MU-MIMO transmission as feedback.

* * * * *